United States Patent Office 3,532,663
Patented Oct. 6, 1970

1

3,532,663
PROCESS OF PREPARING ORGANIC EMULSIONS

Peter Francis Nicks, Maidenhead, and Desmond Wilfrid John Osmond, Windsor, England, assignors to Imperial Chemical Industries Limited, London, England, a corporation of Great Britain No Drawing. Filed Nov. 10, 1966, Ser. No. 593,268
Int. Cl. C08f *47/18, 47/20;* C08j *1/48*
U.S. Cl. 260—34.2 7 Claims

ABSTRACT OF THE DISCLOSURE

Improved emulsions in which dispersed particles of liquid are stably and finely dispersed in another liquid using as an emulsifying agent a polymeric material containing in its molecule at least one chain-like component of a type which is soluble in the liquid of the disperse phase and at least one chain-like component of another type which is soluble in the liquid of the continuous phase, the average molecular weight of the individual components being at least 1000, the total molecular weight of the individual components of each type being at least 3000 or at least $n \times 1000$, where $n$ is the number of the individual components of the other type, whichever is the higher and the ratio of the total molecular weights of the individual components of the two types being from 3:1 to 1:3. The emulsion is made by dissolving the emulsifying agent in the liquid which is to become the continuous phase and mixing the resultant solution with the liquid which is to become the disperse phase.

This invention relates to improved emulsions, i.e. dispersions of liquid particles in a liquid continuous phase, to processes of making such emulsions and to products obtained from such emulsions.

We have found that improved emulsions in which the disperse particles are more stably and finely dispersed can be made by using as emulsifying agent a polymeric material containing in its molecule at least one chain-like component of a type which is soluble in the liquid of the disperse phase and at least one chain-like component of another type which is soluble in the liquid of the continuous phase, the average molecular weight of the individual components being at least 1,000, the total molecular weight of the individual components of each type being at least 3,000 or at least $n \times 1000$, where $n$ is the number of the individual components of the other type, whichever is the higher and the ratio of the total molecular weights of the individual components of the two types being from 3:1 to 1:3.

Preferably the average molecular weight of the individual components is at least 1,500 and the total molecular weight of each type of component is at least 4,500.

By means of such agents its is possible to produce stable emulsions of a colloidal nature, i.e. emulsions in which the disperse particles are of average diameter less than $1\mu$.

The liquids of the disperse and continuous phases should be those displaying essentially Newtonian flow characteristics, i.e. displaying no significant visco-elastic characteristics, and having a viscosity of up to 1,000 poises at the temperature at which the emulsion is formed.

2

The solubility of the above-described components of the emulsifying agent in their respective liquids should be such that the component and liquid are miscible in all proportions, and the liquid when containing 10% by weight of the component should continue to display essentially Newtonian flow characteristics. Although the component need not normally be present in such a high proportion in a liquid in the emulsions of this invention, it should meet this flow requirement at 10% concentration in order to indicate that there is little or no tendency to self-association of the components when dissolved in liquid. We have found this to be an important feature in the selection of components for use in the emulsions of this invention. It is believed that use of emulsifier components are chain-like and of at least the minimum molecular weight as specified above and are truly molecularly soluble in their respective liquid leads to high gains in entropy of the disperse system which results in the high degree of stability of the emulsions.

The emulsifying agent may be a simple block copolymer consisting of two chain-like components, one of each type as described above. In this case the molecular weight of each component must be at least 3,000. The components may be of higher molecular weights, the upper limit being set only by the practical difficulties of making block copolymers containing high molecular weight components. Alternatively, the agent may be a copolymer comprising a polymeric backbone providing one type of component and carrying, as one or more side chains, components of the other type.

This type of copolymer may be made by conventional graft polymerisation or by copolymerisation of a monomer, which will form the backbone, with a soluble chain-like component of molecular weight at least 1,000 and preferably at least 1,500, having an ethylenically unsaturated group. Copolymerisation results in attachment of the chain-like component to the backbone. Another alternative is to copolymerise two types of chain-like component, each having an unsaturated group, so as to produce a polymer backbone from which are pendent the two types of chain-like components required in the emulsifying agent.

Where there is only one side chain then the backbone provides one component and the side chain the other, both being of molecular weight at least 3,000. Where there are two or more side chains of one type of component their total molecular weight must be at least 3,000 and the average molecular weight of the components of that type must be at least 1,000. Where there are $n$ side chhains and $n$ is greater than 3, the molecular weight of the backbone must be at least $n \times 1,000$, preferably at least $n \times 1,500$.

The invention is not limited to emulsions in which one of the phases is aqueous and in fact one of its particularly useful characteristics is its application to emulsions of organic liquids in organic liquids.

The general requirement of the two liquids of the emulsion is that they are inert towards each other and form two phases in the proportions and under the conditions in which they are used; provided these conditions are met they may be selected from any of the broad range of organic and aqueous liquids. Considering them from the polarity point of view, the liquids may range from the highly non-polar aliphatic and aromatic hydrocarbons through long chain esters and ketones, through short chain esters and ketones to ethers and alcohols and to the highly polar lower alkanols and water. From the point of view of molecular structure the liquids may range from small simple molecules to products of addition or condensation polymerisation, but generally these latter are limited to oligomers and low molecular weight polymers because of the requirement that they must be liquid at the temperature at which the emulsion is formed. The phases may be mixtures of miscible liquids or solutions, e.g., of a solid in a liquid, and the emulsions may also contain more than one type of dispersed liquid phase.

The question of which liquid is to form the disperse phase and which is to form the continuous phase of the emulsion may be determined by the method in which the emulsion is formed. In general, if the emulsifying agent is dissolved in one liquid and the other liquid is mixed with this solution then the liquid initially containing the emulsifying agent will become the continuous phase. This will be so irrespective of whether the agent-free liquid is added to the solution or vice versa.

Further, the emulsion will not be reversed even if so much of the agent-free liquid is added that it cannot be accommodated in disperse form in the continuous phase; in this case the excess agent-free liquid will simply form a separate layer in the emulsion. Consequently, it is possible to prepare stable emulsions containing as much as 50% by weight and in some cases as much as 80% by weight of disperse phase.

The proportion of emulsifying agent required will usually range from 1–10% by weight of the disperse phase. In general, the corresponding particle size of the disperse phase will be of the order of 2–0.1$\mu$ dependent on the proportion of agent used and for particularly fine emulsions it is preferred to use emulsifying agent in a proportion of from 5–10% by weight of the disperse phase, which will produce particle sizes in the range 0.5–0.1$\mu$.

Solubility of the components of the emulsifying agent in the liquids of the emulsion is dependent primarily on them being approximately of the same polarity. On the other hand, for the liquids of the emulsion to be immiscible they must usually be of different polarities; in general, therefore, a component which is soluble in one liquid of the emulsion will not be soluble in the other.

Although, using emulsifying agents in accordance with this invention, it is possible to emulsify a first liquid in a second, or the second in the first at will by the technique described above, it is convenient in a general discussion of emulsifying agents suitable for use with various liquids to deal firstly with those liquids likely to be used as the continuous phase. This is simply because in general these will be cheap readily-available liquids of which three main classes can usefully be discussed.

The liquid most commonly used as the continuous phase of emulsions is water. In emulsifying agents to be used in emulsions having an aqueous continuous phase, the chain-like component of the agent to be soluble in the aqueous phase may be, for example:

polyethylene oxide condensates, either hydroxyl-terminated or methoxyl-terminated;
polymers of vinyl pyrollidone and copolymers thereof;
polymers containing dimethylaminoethyl methacrylate or diethyl aminoethyl methacrylate as the salt, e.g. the hydrochloride, if desired;
polymers containing methacrylamide or acrylamide;
polymers containing substantial quantities of carboxyl group, e.g. polymers containing methacrylic acid, acrylic acid, itaconic acid, etc. either as the free acid or solubilised by means of a change in pH of the solution, i.e. formation of the sodium, potassium, ammonium or organic amine salt.

These components illustrate that suitable components need only have the solubility and molecular weight requirements described above.

Another class of common liquids which by application of this invention become available for use as the continuous phase of emulsions are aliphatic and aromatic hydrocarbons. Appropriate chain-like components for emulsifying agents for use in conjunction with aliphatic hydrocarbons, such as pentane, hexane, heptane and octane, include:

polymers of long chain esters of unsaturated acids, e.g. stearyl, lauryl, octyl, 2-ethyl hexyl, hexyl and butyl esters of acrylic and methacrylic acids;
polymers of vinyl esters of long chain acids, e.g. vinyl stearate and vinyl esters of versatatic acid;
polymeric vinyl alkyl ethers or higher alkylene oxides, e.g. polypropylene oxide of molecular weight 1,000–3,000;
polymers of butadiene and isoprene and non-crystalline polymers of ethylene and propylene;
self-polyesters (of molecular weight greater than 1,000) of hydroxy fatty acids, e.g. 12-OH stearic acid, hydrogenated castor oil fatty acids and the hydroxy acids of carnauba wax;
polyesters of di-acids with diols, e.g. polyesters of sebacic acid with 1,12-dodecane diol or of adipic acid with neopentyl glycol.

The organic liquid may, of course, be a commercially available hydrocarbon mixture, such as mineral spirits and white spirit, which also are suitable. Where the organic liquid is mainly aromatic hydrocarbon in nature, e.g. xylene and xylene mixtures, benzene, toluene and other alkyl benzenes and solvent naphthas, similar soluble components may be used and, in addition, shorter chain analogues, e.g. polymers of ethoxy ethyl methacrylate, methyl methacrylate and ethyl acrylate. Other components suitable for use in this type of organic liquid include:

aromatic polyesters, e.g. non-drying oil-modified alkyd resins;
aromatic polyethers;
aromatic polycarbonates; and
polymers of styrene and vinyl toluene.

Another useful class of organic liquids for use as the continuous phase includes esters and ketones. Suitable chain-like components for emulsifying agents for use in conjunction with these liquids include:

polymers of esters of short chain alcohols and unsaturated acids, e.g. methyl methacrylate and ethyl acrylate;
aliphatic polyethers;
polyesters of short chain acids and alcohols.

Although the above classes of liquids have been described as suitable continuous phases it will be obvious that say aliphatic hydrocarbons may be emulsified in water, and vice versa. The requirements in respect of the appropriate chain-like component of the emulsifying agent to be used with any particular liquid will be the same whether it is to be in continuous or disperse phase and so the components exemplified above may be used when the appropriate liquid is to be emulsified. Also, as stated above, the solubility of a chain-like component in a liquid is dependent primarily on them being of similar polarity. Consequently the chain-like components listed above may usually be used with liquids of polarity similar to those classified above.

This invention is particularly useful when applied to dispersions of low molecular weight materials such as polyesters and plasticisers, polyethers and epoxides, amino and phenolic resins, isocyanate-containing resins, and other crosslinkable oligomers. For example:

aromatic esters, such as di($\beta$-ethoxyethyl) phthalate may be emulsified in water or aliphatic hydrocarbon using an emulsifying agent in which the chain-like component soluble in the ester is, say, a copolymer of methyl methacrylate and methacrylic acid (98:2 w./w.);

aliphatic ester, such as poly(propylene adipate) may be emulsified using as chain-like component a styrene/vinyl toluene copolymer;

for OH-terminated polyethers such as OH-terminated polypropylene oxide condensate of hexane triol a suitable soluble chain-like component is a polyethylene or polypropylene glycol of molecular weight of 1,000 or more; for epoxide resins, including those which are solid at room temperature but liquid at the temperature at which they are to be emulsified and for amino resins such as a lightly condensed hexamethoxy methyl melamine, a suitable soluble chain-like component is a methyl methacrylate copolymer containing up to 10% of methacrylic acid; or an epoxy resin with a molecular weight of above 1,000; for phenol formaldehyde resin such as methylol diphenylol propane condensate a suitable soluble chain-like component is polystyrene or a methyl methacrylate copolymer as for amino resin; for monomers which dissolve the polymer thereof, a suitable soluble chain-like component is a polymer thereof, e.g. for dimethylaminoethyl methacrylate and low molecular weight copolymers a suitable chain-like component is polydimethylaminoethyl methacrylate; for petroleum greases, jellies or waxes, a suitable soluble chain-like component is a self-ester of 12–OH stearic acid.

Characteristics of the emulsion of this invention are their stability and fine particle size, and where the term "fine" is used in the examples to follow, we mean particles of average diameter less than 1$\mu$. The invention is of value in paint technology, for example in that it can be used to prepare emulsions of crosslinkable oligomers in cheap liquids in place of solutions of such oligomers in more expensive solvents. It is particularly useful in that two components of a crosslinking system may be emulsified in separate disperse phases in the same liquid and provided the components are of low solubility in the continuous phase, little or no crosslinking will take place in the emulsion However, on forming a film of the emulsion and evaporating the continuous phase, the two disperse phases coalesce and crosslinking takes place. Such double dispersion phase systems include epoxy/amine adduct and polyether (or polyester)/isocyanate compositions.

The invention may also be used in emulsifying prepolymers of fibre-forming polymers, insecticides and other biologically active materials, compositions for aerosol dispensers, cosmetics, etc.

Whilst, when the emulsions are formed, the disperse and continuous phases are liquid, the emulsion may then be treated to convert the disperse phase to a finely divided solid, e.g. by cooling or crosslinking.

The two types of components of the emulsifying agent may be linked together in any conventional manner. For example, components containing suitable reactive groups may be linked by condensation reactions, typical reactions giving rise to condensation links being:

(i) Ester links, especially when formed by ester-interchange or by a reaction such as carboxyl/glycidyl or hydroxyl/acid chloride or hydroxyl/acid anhydride;
(ii) Ether links, especially when formed by addition reactions between alkylene oxides and hydroxyl;
(iii) Amide links, especially when formed by amine/acid chloride reaction;
(iv) Urethane links, especially when formed by reaction of isocyanate with hydroxyl groups.

In order to avoid the possibility of crosslinking one of the components should be substantially mono-functional in such reactions, and preferably the functional group should be at one end of the component. Where several mono-functional components are to be attached to the other component, the other component must be suitably poly-functional.

Where the component is itself made by a condensation reaction use may be made of residual reactive groups. For example, residual carboxyl or hydroxyl groups in a polyester chain-like component may be used to link that component to the other component of the emulsifying agent. Similarly, a hydroxyl group in a polyalkylene oxide chain may be used to link that component to another.

Where the component is made by polymerisation, a monomer containing a suitable reactive group may be copolymerised with the main monomer. Particularly where mono-functional components are required, suitable polymers containing a terminal reactive group may be made, for example, by polymerising ethylenically unsaturated monomer in the presence of an initiator and a chain transfer agent, both of which contain the group reactable in a condensation reaction. Such processes are described in our Patent 3,390,206. The agents may also be made by conventional block or graft copolymerisation. The product of such copolymerisation will usually be a mixture of various products which will require purifying to obtain the desired emulsifying agent and preferably the agents are made by addition copolymerisation of an ethylenically unsaturated monomer, which when polymerised will provide one type of component, with components of the other type which contains or have attached thereto a copolymerisable ethylenically unsaturated group.

Alternatively, the agent may be formed by copolymerising two types of chain-like components, each of which contains an unsaturated copolymerisable group (and so may be termed macro-monomers) to form a polymer backbone carrying the two types of soluble chain-like components. Where stearic interference between the chain-like components causes difficulty in preparing the copolymer a third monomer of conventional low molecular weight may also be added as a co-monomer to space out the chain-like components along the backbone, thus facilitating the copolymerisation.

Components may be converted into macro-monomers suitable for use in this way by taking those containing a condensation reactable group as described above and reacting the group with a compound containing a complementary reactive group and an unsaturated copolymerisable group. For example, where a reactive group is introduced into a polymeric chain-like component by use of a suitable co-monomer containing such a group, and the reactive group is then reacted with an unsaturated compound, suitable systems are illustrated by the following table:

| Main component of polymeric chain of Precursor | Copolymerised with small proportion of— | Subsequently condensed with— |
|---|---|---|
| Styrene, vinyl toluene | Glycol monomethacrylate | Methacryloyl chloride. |
| $\alpha$-Methyl styrene | Glycidyl methacrylate | Methacrylic acid. |
| 2-ethyl hexyl acrylate | Methacrylic and acrylic acids | Glycidyl methacrylate. |
| Lauryl methacrylate, etc | Methacryloyl chloride, etc | Glycol monomethacrylate. |

Alternatively, the monomer used to make the polymeric chain-like component may itself contain a reactive group which can be reacted with the unsaturated compound, for example:

| Main component of polymeric chain: | Subsequently condensed with— |
|---|---|
| Polymeric acrylic or methacrylic acid. | Glycidyl acrylate. |
| Polymeric glycol monomethacrylate. | Acroyloyl chloride. |
| Polyvinyl acetate (subsequently hydrolysed). | Do. |

The invention is illustrated by the following examples in which all parts are by weight.

EXAMPLE 1

(A) 133 parts of di-($\beta$-ethoxy ethyl) phthalate were added slowly with vigorous stirring in an emulsifier to a solution of 13.3 parts of an emulsifying agent in 200 parts of an aliphatic hydrocarbon of boiling range 70–90° C. The emulsifying agent was a copolymer of methyl methacrylate and methacrylic acid (98:2) of molecular weight about 30,000 carrying on average about 20 side chains of poly-12-OH stearic acid of average molecular weight about 1500. A stable, fine particle size emulsion resulted.

(B) 133 parts of di-($\beta$-ethoxy ethyl) phthalate were added to a solution of 13.3 parts of a random copolymer of equal weights of cetostearyl methacrylate and methacrylic acid (added as a 50% solution in xylol/butanol 70/30 w./w.) in 200 parts of aliphatic hydrocarbon (boiling range 90–120° C.). The mixture was vigorously stirred and a coarse emulsion resulted which separated quickly into two phases. This is because the two monomer units were randomly arranged in the copolymer instead of being in a segmented arrangement as in the copolymer of A above. Such a random copolymer does not provide the necessary two types of chain-like components of the specified minimum molecular weights.

(C) 13.3 parts of the emulsifying agent described in A above were dissolved in 133 parts of di($\beta$-ethoxy ethyl) phthalate. 200 parts of an aliphatic hydrocarbon (boiling range 70–90° C.) were added with vigorous stirring. A stable emulsion of aliphatic hydrocarbon in ester resulted. Dilution of the emulsion with further quantities of aliphatic hydrocarbon did not affect the stability.

EXAMPLE 2

100 parts of a polyester plasticizer prepared by condensation of adipic acid with hexylene glycol were added slowly with stirring under the conditions described in Example 1(A) to a solution of 10 parts of an emulsifying agent in 150 parts of aliphatic hydrocarbon having a boiling range of 70–90° C. The emulsifying agent was a copolymer of styrene/vinyl toluene glycidyl methacrylate in the ratio 18/29/3 by weight and of molecular weight about 25,000 carrying on average about 16 side chains of poly-12-OH stearic acid of average molecular weight about 1,500. A fine particle size emulsion resulted which was stable on storage.

EXAMPLE 3

10 parts of a solid epoxide resin having an epoxide equivalent of 450–525 were heated to 90–100° C., at which temperature the resin was liquid, and added to a solution of 3 parts of the emulsifyng agent described in Example 1(A), in 200 parts of an aliphatic hydrocarbon having a boiling range of 140–160° C., the solution being heated to 120° C. Vigorous agitation was achieved during the mixing by means of an emulsifier.

A stable emulsion of the epoxide resin was obtained. On cooling, this gave a fine particle size dispersion.

EXAMPLE 4

(A) 300 parts of a liquid epoxy resin having an epoxide equivalent of 175–210 were heated to 70° C. and added slowly with vigorous stirring to a solution of 30 parts of an emulsifying agent as described in Example 1(A) and 200 parts of aliphatic hydrocarbon having a boiling range of 140–160° C.

A stable, low viscosity emulsion resulted which had a fine particle size distribution.

(B) 12 parts of an emulsifying agent as described in Example 1(A) were dissolved in 120 parts of a commercially available liquid epoxy resin and the mixture added with vigorous stirring to 80 parts of an aliphatic hydrocarbon (boiling range 70–90° C.). A stable emulsion was produced which consisted of aliphatic hydrocarbon in epoxide resin. Dilution of the dispersion with further epoxy resin had no effect, dilution with aliphatic hydrocarbon caused flocculation.

EXAMPLE 5

44 parts of hexamethoxymethyl melamine were added with vigorous stirring to a solution of 4.4 parts of the emulsifying agent described in Example 1(A) in 200 parts of aliphatic hydrocarbon boiling range 70–90° C.

A stable emulsion resulted. On evaporation of the hydrocarbon, the disperse particles coalesced to a continuous film.

EXAMPLE 6

200 parts of a 40% solution in ethyl acetate of an isocyanate prepolymer having free NCO groups (commercially available as "Suprasec" 3240) were added with vigorous stirring to a solution of 8 parts by weight of the emulsifying agent described in Example 2 and 200 parts of aliphatic hydrocarbon having a boiling range 70–90° C. A stable emulsion resulted.

EXAMPLE 7

133 parts of glycerol were added slowly with vigorous stirring to a solution comprising 13.3 parts of an emulsifying agent described below and 200 parts of an aliphatic hydrocarbon having a boiling range 70–90° C. A stable, fine particle size emulsion resulted.

The emulsifying agent consisted of a copolymer of vinyl pyrollidone/acrylic acid copolymer (4:1) of molecular weight about 30,000 carrying on average 20 side chains of poly-12-OH stearic acid of average molecular weight about 1,500.

EXAMPLE 8

100 parts of a solution of 15 parts of a vinyl chloride/vinyl acetate/maleic anhydride copolymer dissolved in 85 parts of $\beta$-ethoxyethyl phthalate was added under conditions of vigorous shear to 100 parts of an aliphatic hydrocarbon containing 30 parts of the emulsifying agent described in Example 1(A).

A fine particle size dispersion of the copolymer solution was obtained.

EXAMPLE 9

160 parts of ethylene dichloride were added under conditions of vigorous shear to 40 parts of water in which were dissolved 16 parts of an emulsifying agent consisting of methoxyl-terminated polyethylene glycol methacrylate (molecular weight about 1,200) reacted with a copolymer of 98 parts of methyl methacrylate and 2 parts of methacrylic acid (molecular weight about 40,000). The weight ratio of the two polymeric components of the graft copolymer was 1:1.

A fine particle size emulsion resulted.

EXAMPLE 10

An emulsion of a liquid epoxy resin in a medium boiling range aliphatic hydrocarbon (white spirit) containing 60 parts of epoxy resin and stabilised with the emulsifying agent described in Example 1(A) was blended with a solution of a petroleum bitumen in white spirit containing 60 parts of the bitumen.

The resultant blend was a stable emulsion of the epoxy resin in bitumen solution which did not separate into two phases on standing and when poured on to a glass plate dried to a clear bit-free film.

EXAMPLE 11

To a portion of the emulsion of liquid epoxy resin described in Example 4 was added ethylene diamine (10% of diamine based on the epoxy resin content of the emulsion). Some of the treated emulsion was poured on to a glass plate, the hydrocarbon was evaporated, and the clean, bit-free film which resulted was cured to give a hard, tough product.

The remainder of the emulsion was allowed to stand for 24 hours at room temperature. After that time, the disperse particles no longer coalesced when a film of the emulsion was poured and dried. The disperse particles were shown by electron-microscopy to consist of cross-linked particles of 0.1–0.5 micron diameter.

EXAMPLE 12

In this example the emulsifying agent is essentially a graft copolymer of lauryl methacrylate and methyl methacrylate made by purifying by selective precipitation the product of polymerising methyl methacrylate in a solution of a copolymer of lauryl methacrylate and glycidyl methacrylate (97:3), the glycidyl groups of which had been reacted with methacrylic acid.

In the graft copolymer the weight ratios of the two main monomers was about 1:1 and its total molecular weight was about 60,000.

133 parts of di(ethoxyethyl) phthalate were added to 200 parts of a solution containing 10 parts of the purified graft as prepared above in an aliphatic hydrocarbon (boiling range 90–120° C.). The mixture was vigorously stirred and a stable emulsion of the ester was obtained.

EXAMPLE 13

120 parts of a liquid epoxide resin were heated to 60–70° C. and added to a solution of 12 parts of the purified graft copolymer described in Example 8 in 80 parts of an aliphatic hydrocarbon (boiling range 90–120° C.) also heated to 60–70° C. The mixture was vigorously agitated and a stable emulsion resulted.

EXAMPLE 14

(A) A methoxyl-terminated polyethylene glycol (average molecular weight 1200) was converted to the methacrylate ester by alcoholysis with methyl methacrylate using sodium as catalyst. This ester was copolymerised with methyl methacrylate/methacrylic acid 98/2 to give a graft copolymer of weight ratio 1:1. 100 parts of ethyl acetate were added with vigorous agitation to a solution of 10 parts of this graft copolymer (added as a 33% solution in acetone) in 100 parts of water. A stable, fine particle size emulsion resulted.

(B) When 100 parts of aliphatic hydrocarbon (boiling range 70–90° C.) were added to a solution of 10 parts of the graft copolymer in 100 parts water, with vigorous agitation, a coarse particle size emulsion resulted which rapidly separated into two phases. This is due to the fact that the polyacrylate component of the copolymer is not soluble in aliphatic hydrocarbon.

(C) 100 parts of di(β-ethoxyethyl) phthalate were added to a solution containing 10 parts of a random 1:1 copolymer of methoxyl polyethylene glycol methacrylate/methyl methacrylate (added as a 40% solution in acetone) in 100 parts of water, with vigorous stirring. A coarse particle size emulsion resulted which rapidly separated into two phases. This is because in the random copolymer the two monomer units occur in a random arrangement instead of being arranged separately in chain-like components as in the graft copolymer of A above.

EXAMPLE 15

120 parts of methyl methacrylate were added with vigorous agitation to a solution of 6 parts of the graft copolymer described in Example 14 in 80 parts of water. A fine particle size, stable, low viscosity emulsion resulted.

EXAMPLE 16

100 parts of xylene were added to a solution of 10 parts of graft copolymer described in Example 14 (added as a 33% solution in acetone) in 100 parts of water. A stable emulsion resulted.

EXAMPLE 17

133 parts of a liquid epoxide resin were added to a solution of 13.3 parts of the graft copolymer described in Example 14 (added as a 33% solution in acetone) in 200 parts of water with vigorous agitation. A stable, fine particle size emulsion resulted.

EXAMPLE 18

10 parts of a graft copolymer consisting of a poly-(methyl methacrylate/methacrylic acid 98:2) backbone (molecular weight about 30,000) carrying on average about 3 vinyl pyrollidone side chains (molecular weight about 5,000) were added as a 40% solution in acetone to 100 parts of water. 100 parts of di(β-ethoxyethyl) phthalate were added with vigorous agitation to the aqueous solution of the graft copolymer. A stable emulsion resulted.

EXAMPLE 19

(A) 100 parts of methyl methacrylate monomer were added with vigorous agitation to a solution containing 10 parts of the graft copolymer described in Example 14(A) in 100 parts of water. A stable emulsion resulted. Further dilution of the emulsion with water had no effect on the stability.

(B) 100 parts of methyl methacrylate monomer containing 10 parts of the graft copolymer as described in Example 14(A) (added as a 30% solution in acetone) were added with vigorous agitation to 100 parts of water. A stable emulsion resulted, but this was not dilutable with further quantities of water.

EXAMPLE 20

100 parts of a polyethylene oxide adduct of hexane triol were added under conditions of vigorous agitation to 100 parts of aliphatic hydrocarbon boiling between 90° C. and 150° C. containing 10 parts of a copolymer of (a) an ester of methacrylic acid and a self-ester of 12-OH stearic acid of molecular weight about 2,000, (b) an ester of methacrylic acid and a polyethylene glycol of molecular weight about 1,500, and (c) hydroxyethyl acrylate, the weight ratios of (a):(b):(c) being 4:3:3. Although this is a random copolymer, each monomer (a) and (b) itself contains a chain-like component of molecular weight adequate to meet the requirements for our emulsifying agent. The product of this example was a stable emulsion of fine particle size.

EXAMPLE 21

Emulsions of the polyether triol as prepared in Example 20 and the isocyanate prepolymer as prepared in Example 6 were mixed in stoichiometric proportions (with respect to hydroxyl and isocyanate contents). A homogeneous, stable emulsion resulted which had a greatly enhanced pot life compared with that obtained on mixing the two reactants in bulk.

On pouring a film of the emulsion blend onto a glass plate and allowing the hydrocarbon to evaporate, the disperse particles coalesced to form a clear film which rapidly cured to a hard, tough state at room temperature.

We claim:

1. A process of making an emulsion of a first organic liquid in a second organic liquid which comprises mixing and dispersing said first organic liquid in a solution of an emulsifying agent in the second organic liquid, said first organic liquid constituting the disperse phase, said second organic liquid constituting the continuous phase, and said emulsifier consisting of a polymeric material containing in its molecule at least one chain-like component of a type which is soluble in the first organic liquid and at least one chain-like component of another type which is soluble in the second organic liquid of the continuous phase, the average molecular weight of the individual components being at least 1500, the total molecular weight of the individual components of each type being at least 4500 or at least $n \times 1500$, where $n$ is the number of the individual components of the other type, whichever is the higher and the ratio of the total molecular weights of the individual components of the two types being from 3:1 to 1:3.

2. A process as claimed in claim 1 in which the first organic liquid is emulsified as particles of average diameter less than $1\mu$.

3. A process as claimed in claim 1 in which the said second organic liquid is essentially a hydrocarbon.

4. A process for producing an emulsion of two different organic liquids as separate disperse phases in another organic liquid which comprises mixing (1) an emulsion of a first organic liquid in a second organic liquid obtained by mixing said first organic liquid with and dispersing said first organic liquid in a solution, in the second organic liquid, of an emulsifying agent which is a polymeric material containing in its molecule at least one chain-like component of a type which is soluble in the first organic liquid and at least one chain-like component of another type which is soluble in the second organic liquid, the average molecular weight of the individual components being at least 1500, the total molecular weight of the individual components of each type being at least 4500 or at least $n \times 1500$, where $n$ is the number of the individual components of the other type, whichever is the higher and the ratio of the total molecular weights of the individual components of the two types being from 3:1 to 1:3 and (2) an emulsion of a third organic liquid in a fourth organic liquid obtained by mixing said third organic liquid with an dispersing said third organic liquid in a solution, in the fourth organic liquid, of an emulsifying agent which is a polymeric material containing in its molecule at least one chain-like component of a type which is soluble in the third organic liquid and at least one chain-like component of another type which is soluble in the fourth organic liquid, the average molecular weight of the individual components being at least 1500, the total molecular weight of the individual components of each type being at least 4500 or at least $n \times 1500$, where $n$ is the number of the individual components of the other type, whichever is the higher and the ratio of the total molecular weights of the individual components of the two types being from 3:1 to 1:3, said fourth organic liquid being miscible with said second organic liquid.

5. A process as set forth in claim 4 in which the second and fourth organic liquids are different portions of the same organic liquid.

6. A process as set forth in claim 4 in which said second and fourth organic liquids are different liquids.

7. A process as claimed in claim 4 in which the said first organic liquid is an oligomer and the said third organic liquid is a cross-linking agent for the oligomer.

References Cited

UNITED STATES PATENTS

| | | | |
|---|---|---|---|
| 2,933,468 | 4/1960 | Aldridge et al. | |
| 2,963,452 | 12/1960 | Sinn et al. | |
| 3,264,234 | 8/1966 | Osmond | 260—34.2 |
| 3,317,635 | 5/1967 | Osmond | 260—34.2 |
| 3,355,394 | 11/1967 | Korbanka et al. | |

ALLAN LIEBERMAN, Primary Examiner

U.S. Cl. X.R.

260—31.2, 32.8, 33.6